United States Patent
Banerjee

(12) 
(10) Patent No.: US 9,021,546 B1
(45) Date of Patent: Apr. 28, 2015

(54) SYSTEMS AND METHODS FOR WORKLOAD SECURITY IN VIRTUAL DATA CENTERS

(75) Inventor: Deb Banerjee, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 442 days.

(21) Appl. No.: 13/291,716

(22) Filed: Nov. 8, 2011

(51) Int. Cl.
*H04L 29/06* (2006.01)
*G06F 9/455* (2006.01)

(52) U.S. Cl.
CPC ...... *H04L 63/20* (2013.01); *G06F 2009/45587* (2013.01); *G06F 2221/2145* (2013.01); *H04L 63/105* (2013.01)

(58) Field of Classification Search
CPC ... H04L 63/20; H04L 63/105; H04L 63/1433; H04L 63/1441; G06F 21/57; G06F 21/62; G06F 21/6218; G06F 2221/2145; G06F 9/45533; G06F 9/45558; G06F 2009/45587
USPC .............. 726/1, 26, 27, 29, 30; 713/164, 166; 718/1
See application file for complete search history.

(56) References Cited

U.S. PATENT DOCUMENTS

| | | | | |
|---|---|---|---|---|
| 8,265,071 | B2 * | 9/2012 | Sindhu et al. | 370/388 |
| 8,332,517 | B2 * | 12/2012 | Russell | 709/226 |
| 8,627,442 | B2 * | 1/2014 | Ji et al. | 726/11 |
| 2007/0050765 | A1 * | 3/2007 | Geisinger | 718/1 |
| 2007/0288247 | A1 * | 12/2007 | Mackay | 705/1 |
| 2012/0131662 | A1 * | 5/2012 | Kuik et al. | 726/11 |
| 2012/0222084 | A1 * | 8/2012 | Beaty et al. | 726/1 |
| 2012/0304275 | A1 * | 11/2012 | Ji et al. | 726/11 |

* cited by examiner

*Primary Examiner* — Zachary A Davis
(74) *Attorney, Agent, or Firm* — ALG Intellectual Property, LLC

(57) ABSTRACT

A computer-implemented method for workload security in virtual data centers may include (1) identifying a virtual data center that hosts a plurality of workloads sharing a common computing infrastructure, (2) identifying a workload within the plurality of workloads that is subject to a sensitivity assessment that pertains to an application of at least one security policy to at least one computing resource used by the workload, (3) performing the sensitivity assessment for the workload based at least in part on an attribute of an allocated resource within the common computing infrastructure provisioned to the workload, and (4) applying the security policy to the computing resource based at least in part on the sensitivity assessment for the workload. Various other methods, systems, and encoded computer-readable media are also disclosed.

20 Claims, 6 Drawing Sheets

SYSTEMS AND METHODS FOR WORKLOAD SECURITY IN VIRTUAL DATA CENTERS

BACKGROUND

In the digital age, organizations increasingly depend on computing resources to manage data and to provide services internal and external to the organizations. In order to manage increasingly complex information technology infrastructures, some organizations may use virtual data centers. By virtualizing computing resources (e.g., processing, storage, and/or network resources), a virtual data center may enable an administrator to focus on computing tasks to be performed (i.e., "workloads"), and the computing resources required to execute these tasks, instead of the particular configuration of the underlying physical devices.

Additionally, organizations may wish to protect data (e.g., by backing up, encrypting, securely storing, enforcing access to, monitoring access to, and/or isolating data) in order to ensure compliance with internal or external data-protection requirements, such as governmental laws and regulations, partnership agreements with other organizations, etc. In order to enforce such security policies in the virtual data center context, traditional technologies may allow an administrator to tag a workload with security policies to be enforced in the virtual data center infrastructure. However, an administrator may fail to accurately tag all workloads based on the data accessed by the workloads. Accordingly, the instant disclosure identifies and addresses a need for additional and improved systems and methods for workload security in virtual data centers.

SUMMARY

As will be described in greater detail below, the instant disclosure generally relates to systems and methods for workload security in virtual data centers by applying security policies to workloads based on an analysis of the underlying computing infrastructure that may connect a workload to sensitive data. In one example, a computer-implemented method for workload security in virtual data centers may include (1) identifying a virtual data center that hosts a plurality of workloads sharing a common computing infrastructure, (2) identifying a workload within the plurality of workloads that is subject to a sensitivity assessment, the sensitivity assessment pertaining to an application of at least one security policy to at least one computing resource used by the workload, (3) performing the sensitivity assessment for the workload based at least in part on an attribute of an allocated resource within the common computing infrastructure provisioned to the workload, and (4) applying the security policy to the computing resource based at least in part on the sensitivity assessment for the workload.

The computer-implemented method may perform the sensitivity assessment in any of a variety of ways. For example, performing the sensitivity assessment may include (1) identifying sensitive content in a data store used by the workload for storage and (2) determining that the workload is sensitive based on the sensitive content. In this example, identifying the sensitive content may include (1) identifying a virtual disk exposed to a virtual machine allocated for the workload and (2) identifying the sensitive content on the virtual disk. In some examples, performing the sensitivity assessment may include (1) identifying sensitive content in a data store provisioned on a hypervisor host system that is used for the workload, (2) determining that the hypervisor host system is sensitive based on the sensitive content, and (3) determining that the workload is sensitive based on the determination that the hypervisor host system is sensitive.

In some embodiments, performing the sensitivity assessment may include (1) identifying a first virtual machine within the virtual data center, the first virtual machine being allocated for the workload, (2) identifying a second virtual machine within the virtual data center, the second virtual machine being identified as handling sensitive content, (3) identifying a virtual network connecting a first guest operating system of the first virtual machine to a second guest operating system of the second virtual machine, (4) determining, based at least in part on the identification of the second virtual machine as handling sensitive content and based at least in part on the virtual network connecting the first guest operating system and the second guest operating system, that the first virtual machine is sensitive, and (5) determining that the workload is sensitive based on the determination that the first virtual machine is sensitive.

In some examples, performing the sensitivity assessment may include (1) identifying a first hypervisor host within the virtual data center, the first hypervisor host being used for the workload, (2) identifying a second hypervisor host within the virtual data center, the second hypervisor host being identified as handling sensitive content, (3) determining, based at least in part on a firewall rule on at least one of the first and second hypervisor hosts, that the second hypervisor host is configured to communicate with the first hypervisor host, (4) determining, based at least in part on the determination that the second hypervisor host is configured to communicate with the first hypervisor host and based at least in part on the second hypervisor host being identified as handling sensitive content, that the first hypervisor host is sensitive, and (5) determining that the workload is sensitive based on the determination that the first hypervisor host is sensitive.

Applying the security policy may include any of a variety of steps. For example, applying the security policy may include allocating the computing resource for use by the workload based at least in part on a security feature of the computing resource required by the security policy. Additionally or alternatively, applying the security policy may include allocating the computing resource for use by the workload based at least in part on a data preservation feature of the computing resource required by the security policy.

In some examples, the computer-implemented method may also include (1) identifying a new computing resource used by the workload within the common computing infrastructure and (2) applying the security policy to the new computing resource based at least in part on the sensitivity assessment for the workload. In addition, the computer-implemented method may include (1) identifying an additional workload using the computing resource, (2) identifying an additional sensitivity assessment for the additional workload, and (3) applying an additional security policy to the computing resource based on the additional sensitivity assessment.

In one embodiment, a system for implementing the above-described method may include (1) an identification module programmed to (i) identify a virtual data center that hosts a plurality of workloads sharing a common computing infrastructure and (ii) identify a workload within the plurality of workloads that is subject to a sensitivity assessment, the sensitivity assessment pertaining to an application of at least one security policy to at least one computing resource used by the workload, (2) an assessment module programmed to perform the sensitivity assessment for the workload based at least in part on an attribute of an allocated resource within the common computing infrastructure provisioned to the workload, and (3) an application module programmed to apply the security policy to the computing resource based at least in part on the sensitivity assessment for the workload. The system may also include at least one processor configured to execute the identification module, the assessment module, and the application module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a virtual data center that hosts a plurality of workloads sharing a common computing infrastructure, (2) identify a workload within the plurality of workloads that is subject to a sensitivity assessment, the sensitivity assessment pertaining to an application of at least one security policy to at least one computing resource used by the workload, (3) perform the sensitivity assessment for the workload based at least in part on an attribute of an allocated resource within the common computing infrastructure provisioned to the workload, and (4) apply the security policy to the computing resource based at least in part on the sensitivity assessment for the workload.

As will be explained in greater detail below, by applying security policies to workloads based on an analysis of the underlying computing infrastructure that may connect a workload to sensitive data, the systems and methods described herein may improve the accuracy and/or consistency with which sensitive data is protected within virtual data centers.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
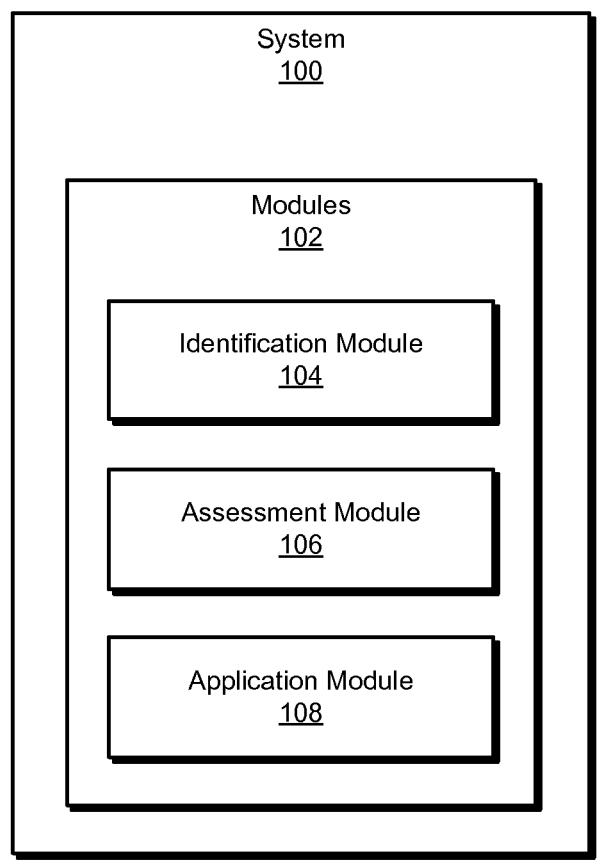
FIG. 1 is a block diagram of an exemplary system for workload security in virtual data centers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
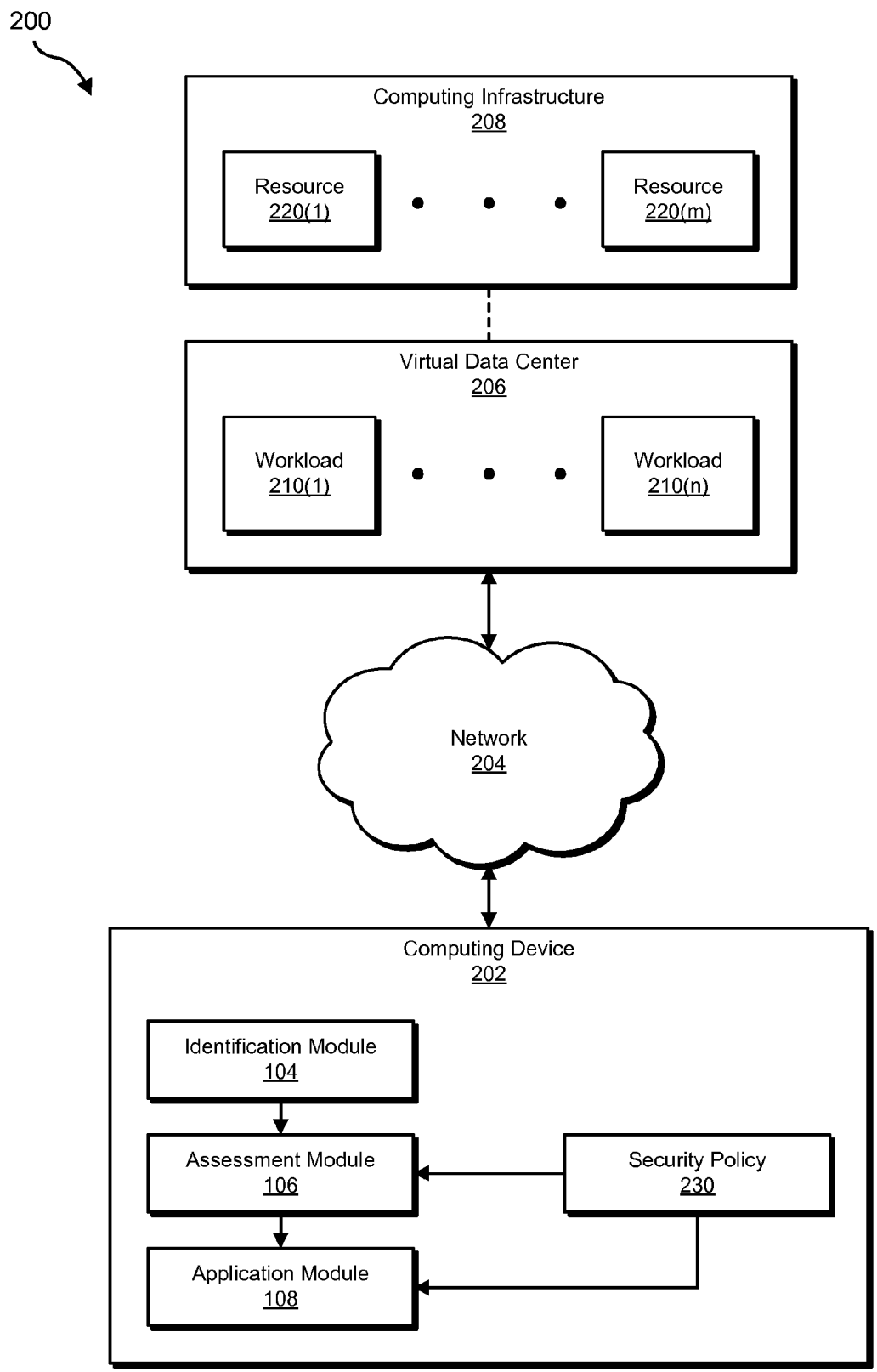
FIG. 2 is a block diagram of an exemplary system for workload security in virtual data centers.

The following will provide, with reference to FIGS. 1-2, detailed descriptions of exemplary systems for workload security in virtual data centers. Detailed descriptions of corresponding computer-implemented methods will also be provided in connection with FIG. 3. Detailed descriptions of an exemplary virtual data center will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for workload security in virtual data centers. As illustrated in this figure, exemplary system 100 may include one or more modules 102 for performing one or more tasks. For example, and as will be explained in greater detail below, exemplary system 100 may include an identification module 104 programmed to (1) identify a virtual data center that hosts a plurality of workloads sharing a common computing infrastructure and (2) identify a workload within the plurality of workloads that is subject to a sensitivity assessment that pertains to an application of at least one security policy to at least one computing resource used by the workload. Exemplary system 100 may also include an assessment module 106 programmed to perform the sensitivity assessment for the workload based at least in part on an attribute of an allocated resource within the common computing infrastructure provisioned to the workload.

In addition, and as will be described in greater detail below, exemplary system 100 may include an application module 108 programmed to apply the security policy to the computing resource based at least in part on the sensitivity assessment for the workload. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, virtual data center 206, and/or computing infrastructure 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a virtual data center 206 via a network 204.

In one embodiment, one or more of modules 102 from FIG. 1 may, when executed by at least one processor of computing device 202, facilitate computing device 202 in improving workload security in virtual data centers. For example, and as will be described in greater detail below, one or more of modules 102 may cause computing device 202 to (1) identify a virtual data center (e.g., a virtual data center 206) that hosts a plurality of workloads (e.g., workloads 210(1)-(*n*)) sharing a common computing infrastructure (e.g., a computing infrastructure 208), (2) identify a workload (e.g., workload 210(1)), hosted within the plurality of workloads, that is subject to a sensitivity assessment that pertains to an application of at least one security policy (e.g., a security policy 230) to at least one computing resource used by the workload (e.g., a resource 220(1)), (3) perform the sensitivity assessment for the workload based at least in part on an attribute of an allocated resource within the common computing infrastructure provisioned to the workload (e.g., a resource 220(*m*)), and (4) apply the security policy to the computing resource based at least in part on the sensitivity assessment for the workload (e.g., apply security policy 230 to resource 220(1) based at least in part on the sensitivity assessment for workload 210(1)).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Virtual data center 206 generally represents any type or form of system that is capable of hosting workloads (e.g., executing tasks) by provisioning the workloads with virtualized resources. Examples of virtual data center 206 include, without limitation, hardware and/or software platforms configured to provide various services and/or run certain applications.

Computing infrastructure 208 generally represents any set of devices capable of facilitating computing operations and/or which may underlie virtualized devices and/or services. For example, computing infrastructure 208 may include one or more physical processing, storage, and/or networking devices.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and virtual data center 206.

Figure 3:
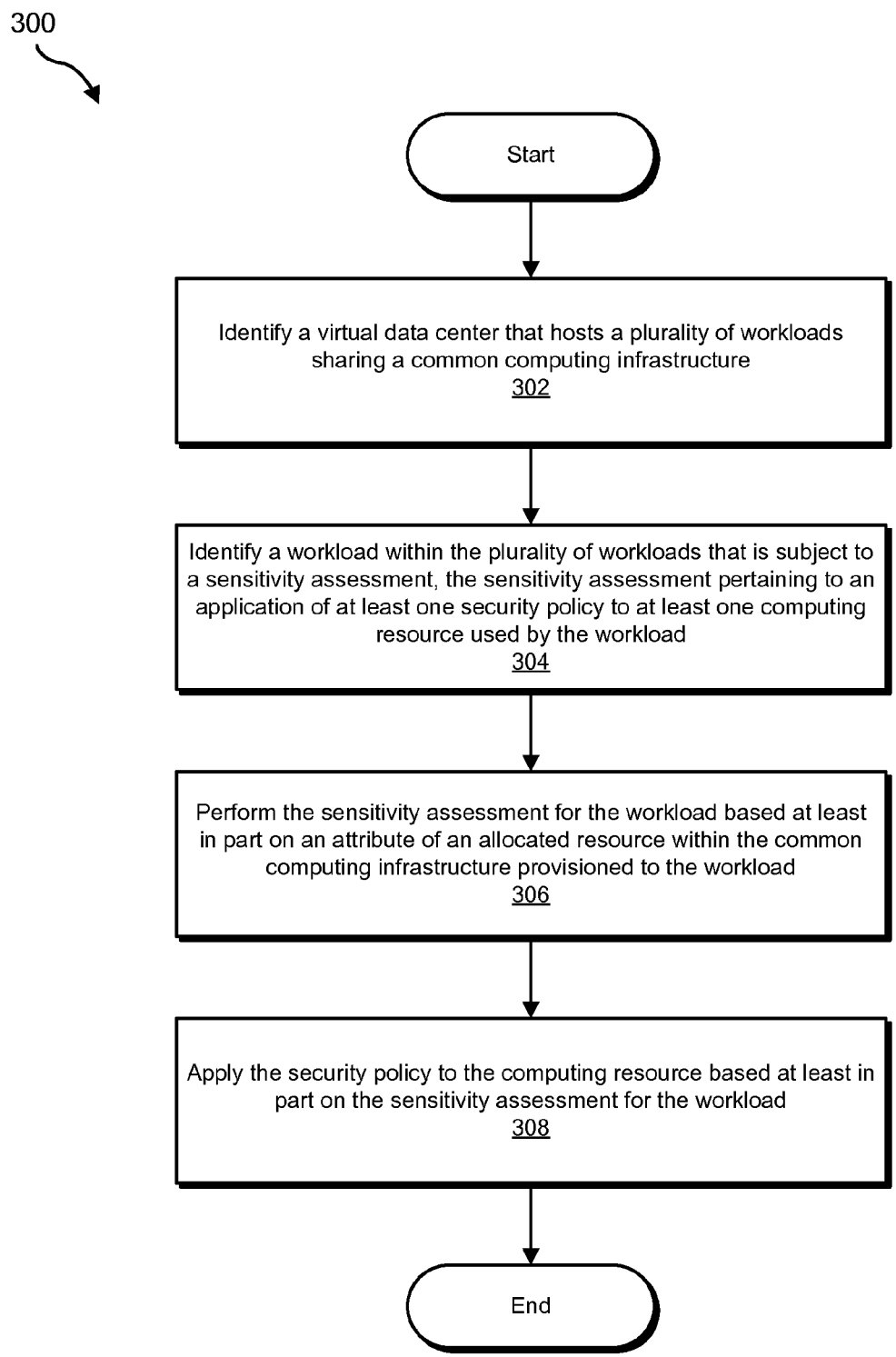
FIG. 3 is a flow diagram of an exemplary method for workload security in virtual data centers.

FIG. 3 is a flow diagram of an exemplary computer-implemented method 300 for workload security in virtual data centers. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a virtual data center that hosts a plurality of workloads sharing a common computing infrastructure. For example, at step 302 identification module 104 may, as part of computing device 202 in FIG. 2, identify virtual data center 206 that hosts workloads 210(1)-(*n*) sharing computing infrastructure 208.

As used herein, the phrase "virtual data center" may refer to any system for virtualizing computing resources (e.g., processing, storage, and/or network resources). In some examples, the phrase "virtual data center" may refer to a system that automatically provisions workloads with virtualized resources. As used herein, the term "workload" may refer to any job, task, and/or application that may be hosted by and/or executed within a virtual data center. For example, a virtual data center may provision a workload with one or more virtualized resources. As used herein, the phrase "common computing infrastructure" may refer to any set of computing resources underlying the virtualized resources provided by a virtual data center. For example, the common computing infrastructure may include one or more hypervisors, storage devices, and/or networking devices.

Identification module 104 may identify the virtual data center in any of a variety of contexts. For example, identification module 104 may identify the virtual data center by operating as a part of a management server and/or platform for the virtual data center. In some examples, identification module 104 may identify the virtual data center by identifying a request from the virtual data center to perform one or more sensitivity assessments. Additionally or alternatively, identification module 104 may identify the virtual data center by receiving a message from another application and/or reading a configuration file that identifies the virtual data center.

Figure 4:
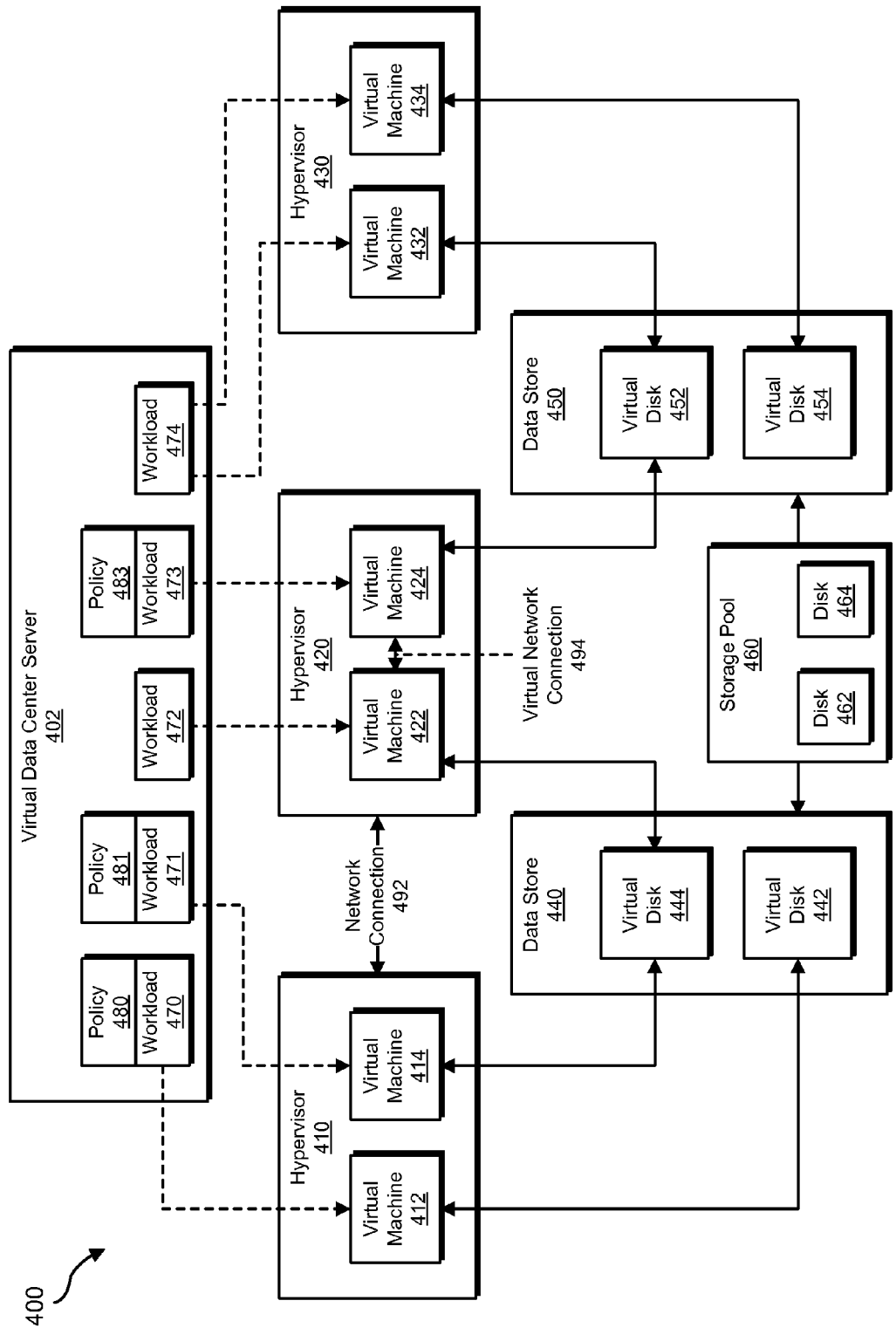
FIG. 4 is a block diagram of an exemplary virtual data center.

FIG. 4 illustrates an exemplary virtual data center 400. As illustrated in FIG. 4, exemplary virtual data center 400 may include a virtual data center server 402 configured to provision resources for workloads 470, 471, 472, 473, and 474. Workloads 470, 471, and 473 may be subject to policies 480, 481, and 483, respectively. Virtual data center 400 may also include a hypervisor 410 hosting virtual machines 412 and 414, a hypervisor 420 hosting virtual machines 422 and 424, and a hypervisor 430 hosting virtual machines 432 and 434. Virtual data center 400 may additionally include a data store 440 including virtual disks 442 and 444 and a data store 450 including virtual disks 452 and 454. Data stores 440 and 450 may represent storage drawn from a storage pool 460 including disks 462 and 464. Using FIG. 4 as an example, at step 302 identification module 104 may identify exemplary virtual data center 400 hosting workloads 470, 471, 472, 473, and 474 (e.g., administrated from virtual data center server 402) sharing a common computing infrastructure (e.g., hypervisors 410, 420, and 430, storage pool 460, and/or a common network infrastructure).

Returning to FIG. 3, at step 304 one or more of the systems described herein may identify a workload hosted within the plurality of workloads that is subject to a sensitivity assessment that pertains to an application of at least one security policy to at least one computing resource used by the workload. For example, at step 304 identification module 104 may, as part of computing device 202 in FIG. 2, identify workload 210(1) that is subject to a sensitivity assessment that pertains to an application of security policy 230 to resource 220(1) used by workload 210(1).

As used herein, the phrase "sensitivity assessment" may refer to any assessment, categorization, rating, characterization, and/or tagging used to designate a possibility, probability, and/or certainty of a workload, resource, service, and/or device accessing, using, handling, processing, and/or storing sensitive data and/or requiring the application of a security policy (e.g., a security policy relating to sensitive data). As used herein, the phrase "sensitive data" may refer to any data that is private, confidential, and/or which otherwise should not be disseminated, accessed, and/or modified without intent and/or authorization.

As used herein, the phrase "security policy" may refer to any policy, rule, rule set, and/or configuration for requiring and/or ensuring compliance with internal and/or external data-protection requirements, such as governmental laws and regulations, partnership agreements with other organizations, good-practice standards, etc. For example, the security policy may include one or more rules for ensuring compliance with the Health Insurance Portability and Accountability Act ("HIPAA"). In another example, the security policy may include one or more rules for ensuring compliance with payment card industry ("PCI") standards (e.g., the Payment Card Industry Data Security Standard ("PCI DSS")). Security policies may include any of a variety of rules. Examples of security policy rules include, without limitation, data storage security rules (e.g., requiring encryption for stored data, requiring storage devices with certain access, reliability, and/or security features), data preservation rules (e.g., requiring backups, replication, and/or indexing of data), network security rules (e.g., rules for firewalls, network password standards, etc.), data transmission rules (e.g., requiring encryption of data in movement across networks), exploit management rules (e.g., requiring use of anti-malware systems, requiring certain system configurations to prevent exploits, etc.), rules for access-control measures (e.g., restricting methods of access to data, requiring identity verification methods, etc.), and rules for security-verification measures (e.g., systems to monitor access to computing resources and/or data, systems to test the security of systems and/or processes).

As used herein, the phrase "computing resource" (or "resource") may refer to any resource used and/or useful for performing a computing task (e.g., hosting and/or executing a workload). In some examples, computing resources may include physical devices such as hypervisors, network devices, and/or storage devices. Additionally or alternatively, computing resources may include virtual computing resources such as virtual machines, virtual networks, and/or virtual disks.

Identification module 104 may identify the workload in any of a variety of contexts. For example, identification module 104 may receive and/or identify a request to perform a sensitivity assessment on the workload. Additionally or alternatively, identification module 104 may identify the workload when the workload is added to the virtual data center. In some examples, identification module 104 may identify the workload as subject to a security assessment on a periodic basis. Additionally or alternatively, identification module 104 may identify the workload in the course of analyzing another workload and/or resource within the virtual data center. For example, identification module 104 may identify the workload by identifying a workload and/or resource using, used by, connected to, and/or in communication with the workload.

Using FIG. 4 as an example, workload 474 may be subject to a sensitivity assessment. Accordingly, at step 304 identification module 104 may identify workload 474. For example, identification module 104 may identify workload 474 by identifying a request to perform a sensitivity assessment on the workload. In another example, identification module 104 may identify workload 474 by determining that workload 474 is associated with hypervisor 430 and/or a virtual machine 432, and/or a virtual machine 434.

Returning to FIG. 3, at step 306 one or more of the systems described herein may perform the sensitivity assessment for the workload based at least in part on an attribute of an allocated resource within the common computing infrastructure provisioned to the workload. For example, at step 306 assessment module 106 may, as part of computing device 202 in FIG. 2, perform the sensitivity assessment for workload 210(1) based at least in part on an attribute of resource 220(m) within common computing infrastructure 208 provisioned to workload 210(1).

The allocated resource may include any computing resource used within the virtual data center. For example, the allocated resource may include a processing resource, a networking resource, and/or a storage resource. The attribute of the computing resource may include any of a variety of attributes, including data handled by the resource and/or a connection and/or relation to another computing resource. For example, as will be described in greater detail below, in some examples assessment module 106 may determine that a workflow and/or computing resource is sensitive by determining that the workflow and/or computing resource uses, is used by, communicates with, and/or is connected to another workflow and/or computing resource that is sensitive. Accordingly, assessment module 106 may propagate sensitivity assessments through components of the virtual data center and/or common computing infrastructure in order to ultimately assess the sensitivity of the workload.

Assessment module 106 may perform the sensitivity assessment for the workload in any of a variety of ways. For example, assessment module 106 may identify sensitive content in a data store used by the workload for storage and determine that the workload is sensitive based on the sensitive content. As used herein, the phrase "sensitive content" may refer to any data that may be relevant to a security policy. For example, sensitive content may include credit card data. Additionally or alternatively, sensitive content may include medical records. In some examples, sensitive content may include computing account information (e.g., usernames, passwords, etc.). In some examples, different classes of sensitive content may trigger different sensitivity assessments. For example, assessment module 106 may identify credit card data in a data store used by the workload for storage and determine that the workload is associated with sensitive credit card data (e.g., and therefore subject to PCI DSS). Assessment module 106 may also identify medical records in a data store used by the workload for storage and determine that the workload is also associated with sensitive medical records (e.g., and therefore also subject to a HIPAA-related security policy).

As used herein, the phrase "data store" may generally refer to any volume provisioned for virtualized storage. For example, the phrase "data store" may refer to a volume provisioned on a virtual machine host (e.g., a hypervisor). In some examples, a data store may include one or more virtual disks. Accordingly, in some examples assessment module 106 may identify sensitive content in the data store by identifying a virtual disk exposed to a virtual machine allocated for the workload. Assessment module 106 may then identify the sensitive content on the virtual disk. As used herein, the phrase "virtual disk" may refer to any file and/or image containing data stored for the use of a virtual machine. In some examples, the data as stored within the virtual disk image may reflect the raw contents and/or structure of a virtual storage device. In one example, the phrase "virtual disk" may refer to a VMWARE VIRTUAL MACHINE DISK ("VMDK"). As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

Assessment module 106 may identify the sensitive content on the virtual disk in any suitable manner. For example, assessment module 106 may perform a data loss prevention scan on the virtual disk and/or identify a result of a data loss prevention scan on the virtual disk. As used herein, the phrase "data loss prevention scan" may refer to a scan performed to identify sensitive information by applying one or more rules and/or heuristics to data within the bounds of a system (e.g., to determine the disposition of the data in various scenarios).

In some examples, assessment module 106 may perform the sensitivity assessment for the workload by propagating the sensitivity assessment to the workload through a hypervisor used by the workload. For example, assessment module 106 may identify sensitive content in a data store provisioned on a hypervisor host system that is used for the workload. Assessment module 106 may then determine that the hypervisor host system is sensitive based on the sensitive content and determine that the workload is sensitive based on the determination that the hypervisor host system is sensitive. As used herein, the term "hypervisor" may refer to any system, device, and/or platform that allows one or more virtual machines and/or guest operating systems to run on a computing system. A hypervisor may include any suitable virtualization software, such as ESX SERVER, VMWARE, ORACLE VM, LYNXSECURE, TRANGO, and/or IBM POWER.

Using FIG. 4 as an example, assessment module 106 may perform a sensitivity assessment on workload 474 by determining that workload 474 uses hypervisor 430 and that hypervisor 430 uses data store 450. Assessment module 106 may then scan data store 450 to determine that data store 450 includes sensitive content and may thereby implicate the sensitivity of the content on data store 450 to workload 474. Additionally or alternatively, assessment module 106 may perform the sensitivity assessment on workload 474 by determining that workload 474 uses virtual machine 432 and that virtual machine 432 uses virtual disk 452. Assessment module 106 may then scan virtual disk 452 to determine that virtual disk 452 includes sensitive content and may thereby implicate the sensitivity of the content on virtual disk 452 to workload 474. In some examples, assessment module 106 may work in the reverse order—e.g., by determining that virtual disk 452 includes sensitive content and then propagating the sensitivity assessment on virtual disk 452 through virtual machine 432 and to workload 474.

In some examples, assessment module 106 may perform the sensitivity assessment on the workload by determining that the workload uses a virtual machine that connects to a sensitive virtual machine via a virtual network. For example, assessment module 106 may identify a first virtual machine within the virtual data center that is allocated (e.g., by the virtual data center) for the workload. Assessment module 106 may also identify a second virtual machine within the virtual data center that is identified as handling sensitive content (e.g., by one or more of the systems described herein in another sensitivity assessment). Assessment module 106 may also identify a virtual network connecting a first guest operating system of the first virtual machine to a second guest operating system of the second virtual machine. Assessment module 106 may then determine, based at least in part on the second virtual machine being identified as handling sensitive content and based at least in part on the virtual network connecting the first guest operating system and the second guest operating system, that the first virtual machine is sensitive. Assessment module 106 may accordingly determine that the workload is sensitive based on the determination that the first virtual machine is sensitive. As used herein, the phrase "guest operating system" may refer to any operating system running within a virtualized environment such as a virtual machine. A guest operating system may include any suitable operating system, such as MICROSOFT WINDOWS, UNIX, and/or LINUX.

Using FIG. 4 as an example, assessment module 106 may perform a security assessment on workload 472 by determining that workload 472 uses a virtual machine 422 and that virtual machine 422 is connected to virtual machine 424 by a virtual network connection 494. Assessment module 106 may further determine that virtual machine 424 is sensitive (e.g., handles sensitive data). For example, workload 473 may be subject to policy 483 due to sensitive data handled by virtual machine 424. Assessment module 106 may accordingly impute the sensitivity of virtual machine 424 to workload 472 (and, e.g., subject workload 472 to policy 483).

Assessment module 106 may identify the virtual network connection in any suitable manner. For example, assessment module 106 may identify the virtual network connection by querying the virtual data center for virtual network resources allocated to the first virtual machine. Additionally or alternatively, assessment module 106 may identify the virtual network connection by receiving a message from an agent operating within the first virtual machine and/or second virtual machine.

In some examples, assessment module 106 may perform the sensitivity assessment by identifying connectivity across hypervisors. For example, assessment module 106 may identify a first hypervisor host within the virtual data center that is being used for the workload. Assessment module 106 may also identify a second hypervisor host within the virtual data center that is identified as handling sensitive content. Assessment module 106 may additionally determine, based at least in part on a firewall rule on the first and/or second hypervisor hosts, that the second hypervisor host is configured to communicate with the first hypervisor host. Assessment module 106 may then determine, based at least in part on the determination that the second hypervisor host is configured to communicate with the first hypervisor host and based at least in part on the second hypervisor host being identified as handling sensitive content, that the first hypervisor host is sensitive. Assessment module 106 may accordingly determine that the workload is sensitive (e.g., based on the determination that the first hypervisor host is sensitive).

As used herein, the phrase "firewall rule" may refer to any policy, rule, and/or configuration for controlling, filtering, blocking, and/or allowing network traffic. In some examples, a firewall rule may identify one or more computing devices, network addresses, and/or network devices. Accordingly, assessment module 106 may determine that the second hypervisor host is configured to communicate with the first hypervisor host by identifying a firewall rule in the first hypervisor host that allows network traffic from the second hypervisor host and/or by identifying a firewall rule in the second hypervisor host that allows network traffic to the first hypervisor host.

Using FIG. 4 as an example, assessment module 106 may perform a security assessment on workload 472 by identifying a network connection 492 between hypervisors 410 and 420 (e.g., based on a firewall rule on hypervisor 420) and determining that hypervisor 410 handles sensitive content (e.g., leading to policy 480 and workload 470 and policy 481 on workload 471). Assessment module 106 may accordingly determine that policies 480 and 481 apply to workload 472.

Returning to FIG. 3, at step 308 one or more of the systems described herein may apply the security policy to the computing resource based at least in part on the sensitivity assessment for the workload. For example, at step 308 application module 108 may, as part of computing device 202 in FIG. 2, apply security policy 230 to resource 220(1) based at least in part on the sensitivity assessment for workload 210(1).

Application module 108 may apply the security policy in any of a variety of ways. For example, application module 108 may perform one or more operations on the computing resource as dictated by the security policy. Additionally or alternatively, application module 108 may apply one or more configurations to the computing resource as dictated by the security policy. In some examples, application module 108 may monitor the computing resource, scan the computing resource, and/or filter data on and/or transmitted by the computing resource.

In some examples, application module 108 may apply the security policy to the computing resource by orchestrating one or more security controls to comply with the security policy. For example, application module 108 may select, manage, assess, and/or implement one or more security controls to comply with the security policy. In various examples, the one or more security controls may protect the confidentiality, integrity, and/or availability of sensitive data.

In some examples, application module 108 may apply the security policy to the computing resource by allocating the computing resource for the workload. For example, application module 108 may allocate the computing resource for use by the workload based at least in part on a security feature of the computing resource required by the security policy. Additionally or alternatively, application module 108 may allocate the computing resource for use by the workload based at least in part on a data preservation feature of the computing resource required by the security policy.

Application module 108 may also apply the security policy to one or more other computing resources associated with the workload. For example, application module 108 may identify a new computing resource used by the workload within the common computing infrastructure. For example, an administrator may direct the virtual data center to provision additional resources for the workload in order to improve the performance of the workload and/or to increase the work performed by the workload. In another example, the virtual data center may automatically allocate the new computing resource to the workload based on a failure and/or scheduled maintenance of a previously allocated computing resource. Application module 108 may then apply the security policy to the new computing resource based at least in part on the sensitivity assessment for the workload. In this manner, the systems and methods described herein may provide consistent security while allowing workload mobility within the virtual data center.

In some examples, application module 108 may also perform sensitivity assessments on other workloads within the virtual data center. For example, application module 108 may identify an additional workload using the computing resource, identify an additional sensitivity assessment for the additional workload, and apply an additional security policy to the computing resource based on the additional sensitivity assessment. In some examples, the additional sensitivity assessment may differ from the sensitivity assessment, and the additional security policy may differ from the security policy. Accordingly, application module 108 may apply multiple security policies to a shared computing resource within the virtual data center by tracking the sensitivity assessments of each workload that uses the computing resource. After step 308, method 300 may terminate.

As explained above, by applying security policies to workloads based on an analysis of the underlying computing infrastructure that may connect a workload to sensitive data, the systems and methods described herein may improve the accuracy and/or consistency with which sensitive data is protected within virtual data centers.

Figure 5:
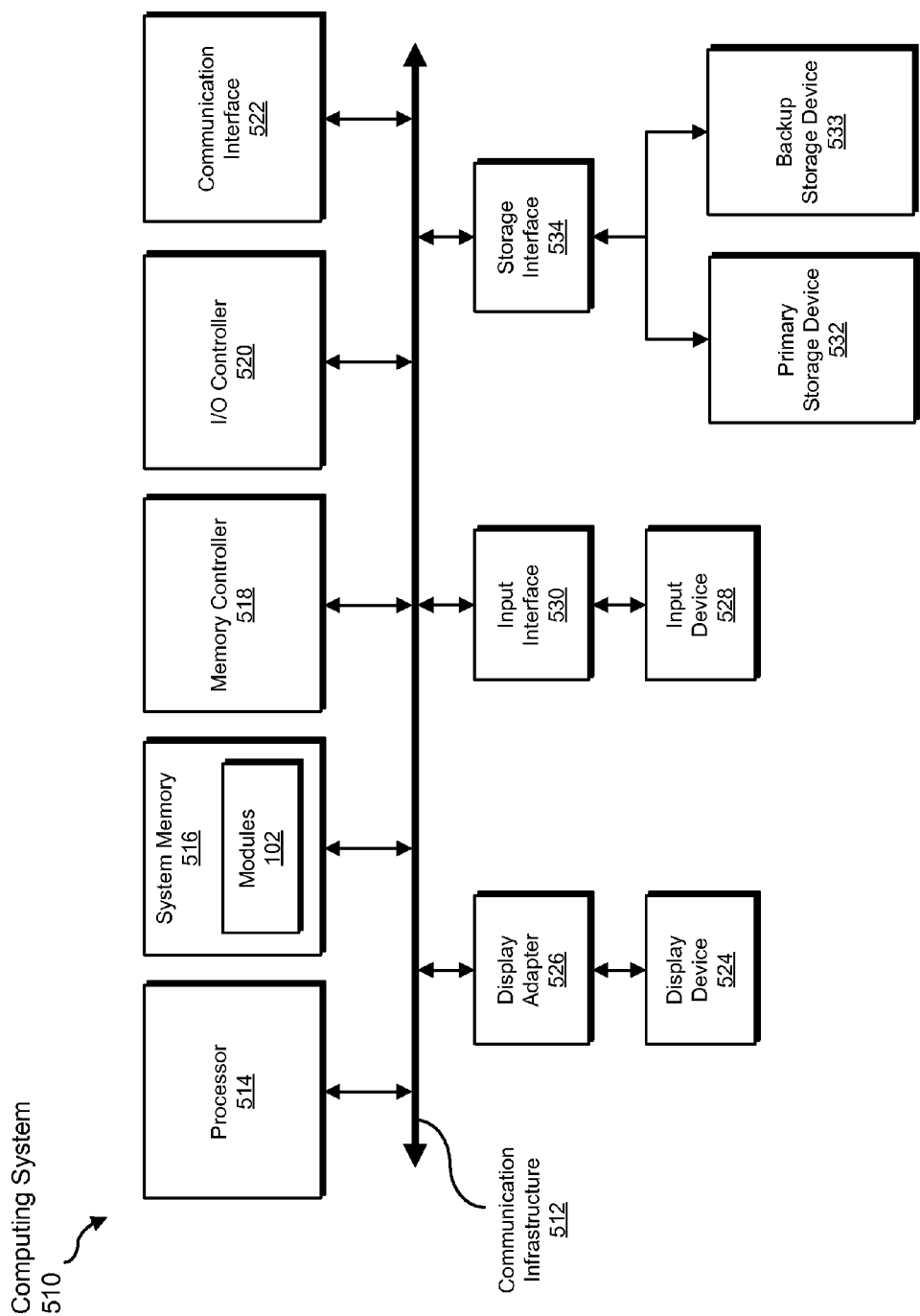
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, performing, determining, allocating, and/or applying steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
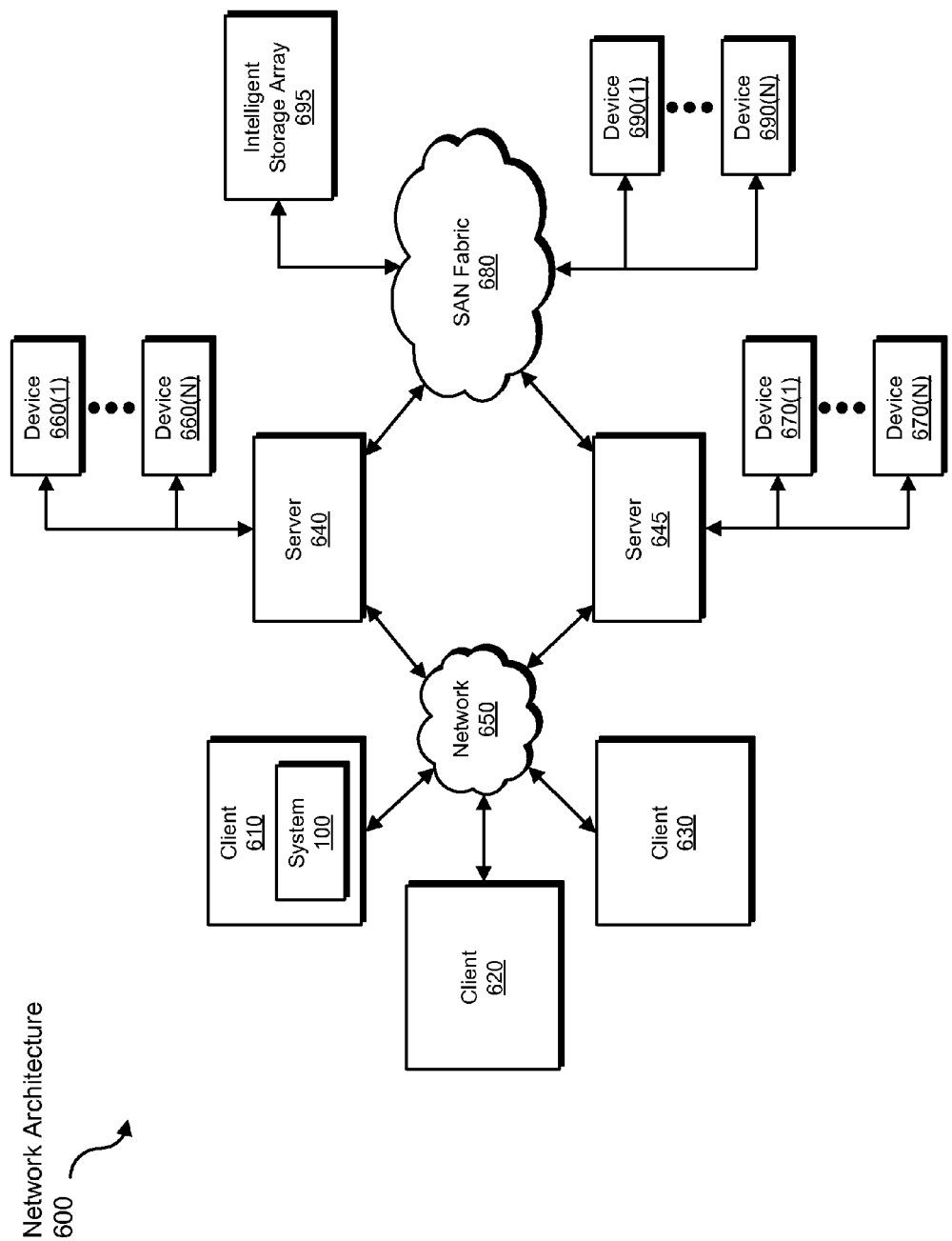
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, performing, determining, allocating, and/or applying steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS).

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for workload security in virtual data centers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a virtual data center into a secure virtual data center. As another example, one or more of the modules recited herein may transform a computing device used within a virtual data center into a secure computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for workload security in virtual data centers, at least a portion of the method being performed by a computing device comprising at least one processor, the method comprising:
   identifying a virtual data center that hosts a plurality of workloads sharing a common computing infrastructure;
   identifying a workload within the plurality of workloads that is subject to a sensitivity assessment, the sensitivity assessment pertaining to an application of at least one security policy to at least one computing resource used by the identified workload;
   performing the sensitivity assessment for the identified workload by determining that a first resource that provides computing infrastructure within the common computing infrastructure and that is provisioned to the identified workload shares a portion of the common computing infrastructure with a second resource that provides computing infrastructure within the common computing infrastructure and that handles sensitive data and determining that the identified workload is sensitive because the first resource is provisioned to the identified workload; and
   applying the security policy to the at least one computing resource based at least in part on the sensitivity assessment for the identified workload.

2. The computer-implemented method of claim 1, wherein performing the sensitivity assessment comprises:
   identifying sensitive content in a data store used by the identified workload for storage; and
   determining that the identified workload is sensitive based on the sensitive content.

3. The computer-implemented method of claim 2, wherein identifying the sensitive content in the data store comprises:
   identifying a virtual disk exposed to a virtual machine allocated for the identified workload; and
   identifying the sensitive content on the virtual disk.

4. The computer-implemented method of claim 1, wherein performing the sensitivity assessment comprises:
   identifying sensitive content in a data store provisioned on a hypervisor host system that is used for the identified workload;
   determining that the hypervisor host system is sensitive based on the sensitive content; and
   determining that the identified workload is sensitive based on the determination that the hypervisor host system is sensitive.

5. The computer-implemented method of claim 1, wherein performing the sensitivity assessment comprises:
   identifying a first virtual machine within the virtual data center, the first virtual machine being allocated for the identified workload;
   identifying a second virtual machine within the virtual data center, the second virtual machine being identified as handling sensitive content;
   identifying a virtual network connecting a first guest operating system of the first virtual machine to a second guest operating system of the second virtual machine;
   determining, based at least in part on the identification of the second virtual machine as handling sensitive content and based at least in part on the virtual network connecting the first guest operating system and the second guest operating system, that the first virtual machine is sensitive; and
   determining that the identified workload is sensitive based on the determination that the first virtual machine is sensitive.

6. The computer-implemented method of claim 1, wherein performing the sensitivity assessment comprises:
   identifying a first hypervisor host within the virtual data center, the first hypervisor host being used for the identified workload;
   identifying a second hypervisor host within the virtual data center, the second hypervisor host being identified as handling sensitive content;
   determining, based at least in part on a firewall rule on at least one of the first and second hypervisor hosts, that the second hypervisor host is configured to communicate with the first hypervisor host;
   determining, based at least in part on the determination that the second hypervisor host is configured to communicate with the first hypervisor host and based at least in part on the second hypervisor host being identified as handling sensitive content, that the first hypervisor host is sensitive; and
   determining that the identified workload is sensitive based on the determination that the first hypervisor host is sensitive.

7. The computer-implemented method of claim 1, further comprising:
   identifying a new computing resource used by the identified workload within the common computing infrastructure; and
   applying the security policy to the new computing resource based at least in part on the sensitivity assessment for the identified workload.

8. The computer-implemented method of claim 1, further comprising:
   identifying an additional workload using the at least one computing resource;
   identifying an additional sensitivity assessment for the additional workload; and
   applying an additional security policy to the at least one computing resource based on the additional sensitivity assessment.

9. The computer-implemented method of claim 1, wherein applying the security policy to the at least one computing resource comprises at least one of:
   allocating the at least one computing resource for use by the identified workload based at least in part on a security feature, required by the security policy, of the at least one computing resource; or
   allocating the at least one computing resource for use by the identified workload based at least in part on a data preservation feature, required by the security policy, of the at least one computing resource.

10. A system for workload security in virtual data centers, the system comprising:
    an identification module programmed to:
    identify a virtual data center that hosts a plurality of workloads sharing a common computing infrastructure;
    identify a workload within the plurality of workloads that is subject to a sensitivity assessment, the sensitivity assessment pertaining to an application of at least one security policy to at least one computing resource used by the identified workload;

an assessment module programmed to perform the sensitivity assessment for the identified workload by determining that a first resource that provides computing infrastructure within the common computing infrastructure and that is provisioned to the identified workload shares a portion of the common computing infrastructure with a second resource that provides computing infrastructure within the common computing infrastructure and that handles sensitive data and determining that the identified workload is sensitive because the first resource is provisioned to the identified workload;

an application module programmed to apply the security policy to the at least one computing resource based at least in part on the sensitivity assessment for the identified workload; and at least one processor configured to execute the identification module, the assessment module, and the application module.

11. The system of claim 10, wherein the assessment module is programmed to perform the sensitivity assessment by:
identifying sensitive content in a data store used by the identified workload for storage; and
determining that the identified workload is sensitive based on the sensitive content.

12. The system of claim 11, wherein the identification module is programmed to identify the sensitive content in the data store by:
identifying a virtual disk exposed to a virtual machine allocated for the identified workload; and
identifying the sensitive content on the virtual disk.

13. The system of claim 10, wherein the assessment module is programmed to perform the sensitivity assessment by:
identifying sensitive content in a data store provisioned on a hypervisor host system that is used for the identified workload;
determining that the hypervisor host system is sensitive based on the sensitive content; and
determining that the identified workload is sensitive based on the determination that the hypervisor host system is sensitive.

14. The system of claim 10, wherein the assessment module is programmed to perform the sensitivity assessment by:
identifying a first virtual machine within the virtual data center, the first virtual machine being allocated for the identified workload;
identifying a second virtual machine within the virtual data center, the second virtual machine being identified as handling sensitive content;
identifying a virtual network connecting a first guest operating system of the first virtual machine to a second guest operating system of the second virtual machine;
determining, based at least in part on the identification of the second virtual machine as handling sensitive content and based at least in part on the virtual network connecting the first guest operating system and the second guest operating system, that the first virtual machine is sensitive; and
determining that the identified workload is sensitive based on the determination that the first virtual machine is sensitive.

15. The system of claim 10, wherein the assessment module is programmed to perform the sensitivity assessment by:

identifying a first hypervisor host within the virtual data center, the first hypervisor host being used for the identified workload;
identifying a second hypervisor host within the virtual data center, the second hypervisor host being identified as handling sensitive content;
determining, based at least in part on a firewall rule on at least one of the first and second hypervisor hosts, that the second hypervisor host is configured to communicate with the first hypervisor host;
determining, based at least in part on the determination that the second hypervisor host is configured to communicate with the first hypervisor host and based at least in part on the second hypervisor host being identified as handling sensitive content, that the first hypervisor host is sensitive; and
determining that the identified workload is sensitive based on the determination that the first hypervisor host is sensitive.

16. The system of claim 10, wherein the application module is further programmed to:
identify a new computing resource used by the identified workload within the common computing infrastructure; and
apply the security policy to the new computing resource based at least in part on the sensitivity assessment for the identified workload.

17. The system of claim 10, wherein the application module is further programmed to:
identify an additional workload using the at least one computing resource;
identify an additional sensitivity assessment for the additional workload; and
apply an additional security policy to the at least one computing resource based on the additional sensitivity assessment.

18. The system of claim 10, wherein the application module is programmed to apply the security policy to the at least one computing resource by at least one of:
allocating the at least one computing resource for use by the identified workload based at least in part on a security feature, required by the security policy, of the at least one computing resource; or
allocating the at least one computing resource for use by the identified workload based at least in part on a data preservation feature, required by the security policy, of the at least one computing resource.

19. A non-transitory computer-readable-storage medium comprising one or more computer-executable instructions that, when executed by at least one processor of a computing device, cause the computing device to:
identify a virtual data center that hosts a plurality of workloads sharing a common computing infrastructure;
identify a workload within the plurality of workloads that is subject to a sensitivity assessment, the sensitivity assessment pertaining to an application of at least one security policy to at least one computing resource used by the identified workload;
perform the sensitivity assessment for the identified workload by determining that a first resource that provides computing infrastructure within the common computing infrastructure and that is provisioned to the identified workload shares a portion of the common computing infrastructure with a second resource that provides computing infrastructure within the common computing infrastructure and that handles sensitive data and determining that the identified workload is sensitive because the first resource is provisioned to the identified workload; and apply the security policy to the at least one computing resource based at least in part on the sensitivity assessment for the identified workload.

20. The computer-readable-storage medium of claim 19, wherein the one or more computer-executable instructions cause the computing device to perform the sensitivity assessment by causing the computing device to:

identify sensitive content in a data store used by the identified workload for storage; and determine that the identified workload is sensitive based on the sensitive content.

* * * * *